Sept. 23, 1924.

A. S. HOWELL 1,509,555

ELECTRIC MOTOR DRIVE AND CONTROL MEANS FOR
MOTION PICTURE MACHINES AND THE LIKE

Filed June 3, 1920    3 Sheets-Sheet 1

Inventor
Albert S. Howell
By
Miehle & Miehle
attys.

Patented Sept. 23, 1924.

1,509,555

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

ELECTRIC-MOTOR DRIVE AND CONTROL MEANS FOR MOTION-PICTURE MACHINES AND THE LIKE.

Application filed June 3, 1920. Serial No. 386,395.

*To all whom it may concern:*

Be it known that I, ALBERT S. HOWELL, a citizen of the United States, residing at Chicago, in the county of Cook and State of Illinois, have invented a certain new and useful Improvement in Electric-Motor Drive and Control Means for Motion-Picture Machines and the like, of which the following is a full, clear, concise, and exact description, reference being had to the accompanying drawings, forming a part of this specification.

My invention relates to an electric motor drive and control means for motion picture machines and the like and has particular relation to such a device as applied to a motion picture camera although not limited to this use alone.

The features of the invention relates to the provision of a motor drive for motion picture machines with a view toward convenience, ease, and universality of control, compactness, enclosure of operating parts, desirable arrangement of parts, simplicity, accessibility, uniformity of operation without attention on the part of the operator, and ease, quickness, and precision in varying the operation of the motion picture machine driven thereby.

The device is preferably a unit complete in itself for attachment to a motion picture machine particularly to a motion picture camera, and certain features relate to the convenient attachment and detachment of the device, particularly with respect to certain motion picture cameras now in use and to the construction and arrangement of the device so that it does not interfere with the operation of these cameras.

The above features and certain other features hereinafter appearing are embodied in the preferred form of my invention hereinafter fully described and illustrated in the accompanying drawings, and are effected by certain novel constructions, combinations, and arrangements of parts particularly pointed out in the claims.

In the said drawings—

Like characters of reference indicate like parts in the various views.

In the drawings 1 designates the casing or main frame of the device. This casing forms an enclosure in which the mechanism of the device is enclosed, and is cylindrical in shape and has one end 2 formed integrally therewith enclosing that end. The other end of the casing is closed by a cap 3 screw threaded therein. Disposed within the casing adjacent the closed end thereof is an electric motor including an armature 4 secured upon a shaft 5, and field coils 6 mounted upon the field structure 7 which encircles the armature, all as is usual. See Fig. 3. The axis of the motor is disposed perpendicularly to the plane of the open end of the casing for purposes hereinafter appearing. The front end of the shaft 5 is supported for rotation in a ball bearing 8 which is supported within a closed bore in the end wall 2 of the casing, and the other end of shaft 5 is supported by a ball bearing 9 adjacent this other end, which bearing is supported within a flanged bore formed in a support 10 which is secured, by means hereinafter described, against a shoulder 11 of the casing facing toward the open or rear end thereof. The field structure 7 is secured in the casing in the following manner. Studs 12 are arranged around the shaft 5 in parallelism therewith and screw threaded into bosses 13 formed on the casing wall adjacent the end 2. These studs extend rearwardly of the bosses 13 and pass through respective apertures formed in the field structure 7. Internally threaded thimbles 14 are screw threaded upon the rear ends of these studs and clamp the field structure against a rearwardly facing shoulder 15 formed on the casing. Headed screws 16 pass through apertures formed in the support 10 and are screw threaded into the rear ends of respective thimbles 14. Thus is the motor assembly secured within the casing in a very compact manner and so that the same may be assembled in the casing from the rear or open end thereof. The commutator 17 of the motor is disposed just in front of the armature 4, and the usual brushes 18 contacting therewith, are secured in insulating bushings 19 secured within bores extending radially of the shaft 5 on opposite side thereof and formed in thickened portions of the casing wall adjacent the end 2 thereof. See Fig. 9.

A forwardly projecting extension, offset from the shaft 5, is formed on the end wall 2 and terminates in a reduced cylindrical end 20. The extension is bored throughout its length concentrically with the end 20, as designated at 21, which bore communicates with the interior of the casing by a reduced bore at its rear end forming a forwardly facing shoulder 22. See Fig. 3. Mounted in this bore for movement longitudinally thereof is a sleeve 23, this sleeve having an enlarged front end within the enlarged portion of the bore and a smaller portion engaging the smaller portion of the bore, a rearwardly facing shoulder 24 being formed thereon at the rear end of the enlarged portion thereof. A screw stud 25, screw threaded into the end 20 in radial disposition relatively to the bore 21 thereof, engages a short longitudinal slot 26 formed in the sleeve to prevent the sleeve from rotating, and the rear end of the slot cooperates with this stud to limit the forward movement of the sleeve. A coiled compression spring 27 encircles the smaller portion of the sleeve 23 and abuts the shoulders 22 and 24 and normally maintains the sleeve in its forwardmost position. A clutch control knob 28 is mounted for rotation in a hole formed in the above mentioned extension to the rear of the end 20 thereof, which hole is disposed radially with respect to the bore 21, and communicates therewith. This knob is retained in said hole by a screw stud 29 screw threaded into a hole in said extension in radial disposition with the knob 28 and engaging a segmental slot 30, see Fig. 8, formed in the knob 28, this screw stud limiting the rotatory movement of the knob. An eccentric pin 31 is formed at the inner end of the knob and engages a circumferential slot 32 formed in the enlarged portion of the sleeve 23 whereby the sleeve may be moved longitudinally of the bore 21 against the influence of spring 27. The segmental slot 30 is so arranged relatively to the pin 31 that when the knob is turned to move the sleeve rearwardly against the spring 27 one end of the slot 30 engages the screw stud 29 shortly after the eccentric pin moves past the rear center of its movement, thus locking the sleeve in its rearward position until the knob is turned in the reverse direction. The forward movement of the sleeve 23 is arrested by the engagement of the screw stud 25 with the rear end of slot 26 before the pin 31 reaches its front center to prevent the locking of the sleeve in its forward position against rearward movement for purposes hereinafter described. The sleeve 23 is bored, and this bore is enlarged at its front end, forming a forwardly facing shoulder.

A shaft 33 is mounted for rotation in the bore of said sleeve and has an enlarged front end forming a rearwardly facing shoulder engaging the aforementioned forwardly facing shoulder of the bore of the sleeve to form a rearward thrust bearing for the shaft. The shaft 33 is reduced at its rear end beyond the sleeve and two opposed friction plates 34 are secured thereon against rotation by a key 35. A gear 36 is carried between these friction plates, the bore of this gear being supported for rotation on a rearwardly projecting hub of the forward friction plate. A headed screw 37 is screw threaded into the rear end of said shaft 33, and a coiled compression spring 38 encircles the shaft and abuts the head of the screw 37 and the rearward friction plate 34 to maintain a frictional driving relation between the gear 36 and the shaft 33 through friction plates 34 by pressing the friction plates together and the forward friction plate against the shoulder of the shaft formed by the reduced rear end thereof. This frictional driving connection prevents the transmission of undue strain from the motor to the motion picture mechanism, or vice versa, when the speed of the motor is changed suddenly, thus protecting the motor and the motion picture mechanism from any undue shock or strain. A relatively wide pinion gear 39 is secured upon the shaft 5 of the motor between the commutator 17 and the bearing 8 and meshes with the gear 36, this pinion being relatively wide to maintain its mesh with gear 36 in all positions of the sleeve 23 in its longitudinal movement, for it will be noted that longitudinal movement of the sleeve effects similar movement of the shaft 33 and parts mounted thereon.

Figures 3, 4, 5, 6, 7, 8:
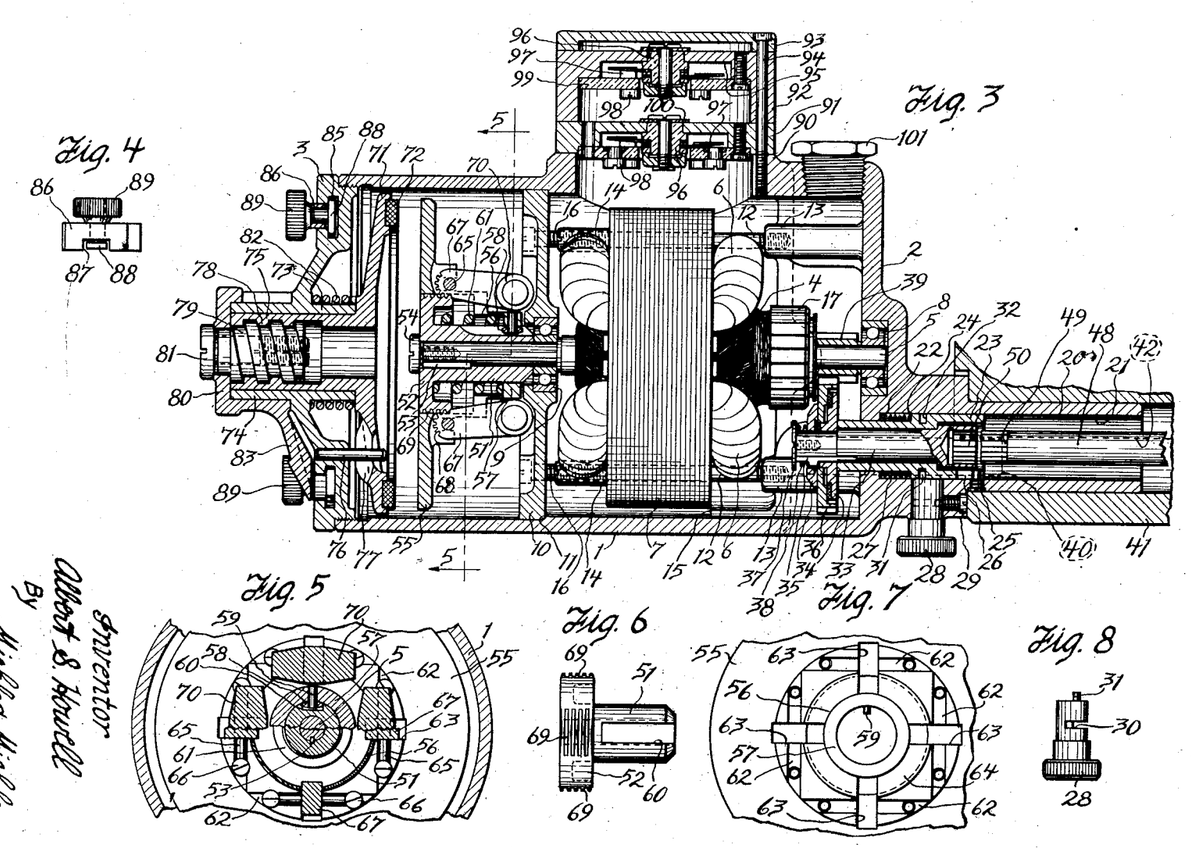
Figure 3 is a central horizontal section of the device with portions of a motion picture camera, to which the device is attached, shown similarly.
Figure 4 is a view in side elevation of the stop lugs hereinafter described.
Figure 5 is a sectional view in front elevation on the line 5—5 of Figure 3.
Figure 6 is a view in side elevation of the governor arbor hereinafter described.
Figure 7 is a partial view in front elevation of the rotating friction element of the governor hereinafter described.
Figure 8 is a side elevation of the clutch control knob hereinafter described.
Figures 9, 10, 11, 12:
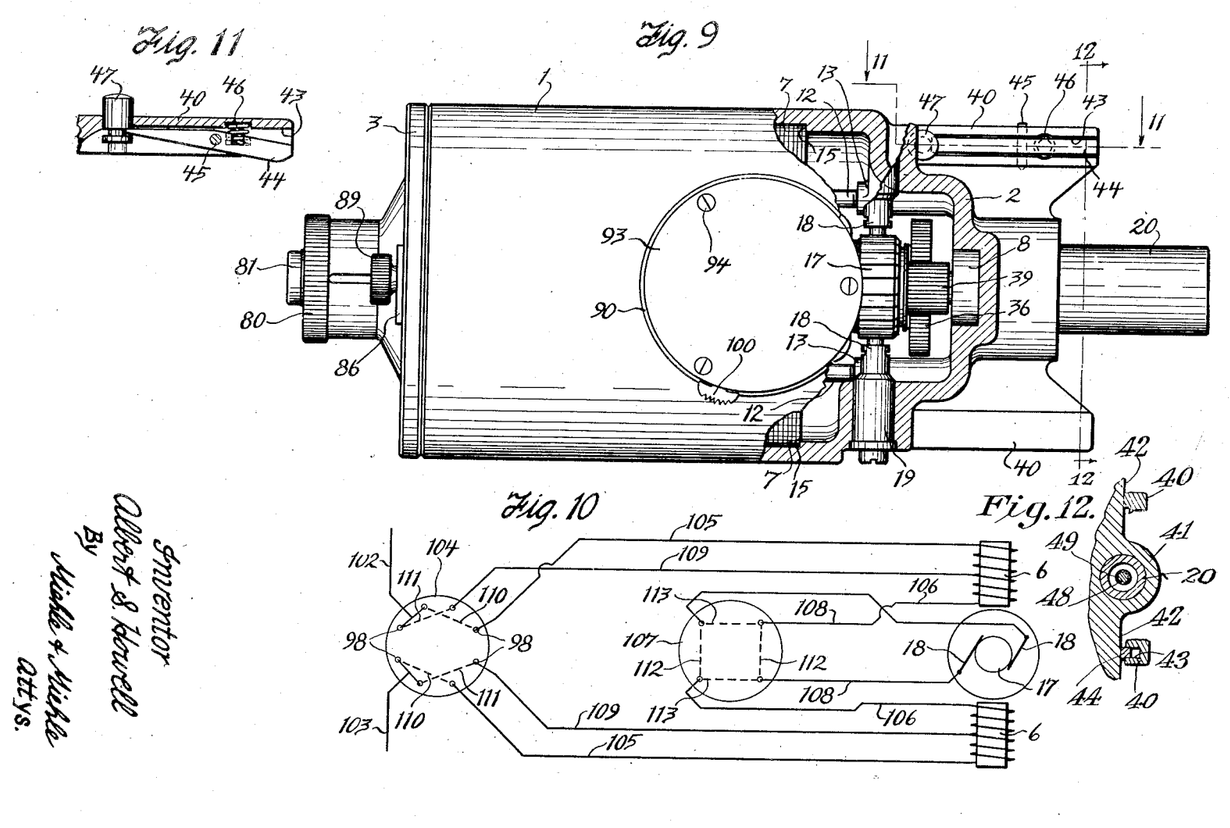
Figure 9 is a plan view of the device with portions thereof broken away to show more clearly the construction.
Figure 10 is a diagrammatical view of the wiring.
Figure 11 is a partial sectional view on the line 11—11 of Figure 9.
Figure 12 is a reduced section on the line 12—12 of Fig. 9 with a portion of a motion picture camera, to which the device is attached, shown similarly.

A lateral projection 40 projects above and one projects below the aforementioned extension beyond the rear end of the end 20 thereof, the outer ends of these extensions projecting forwardly of the rear end of the end 20, see Figs. 3 and 9. In attaching the device to a motion picture mechanism the end 20 is telescoped within a corresponding formation 41 of the frame of the motion picture mechanism and the upper projection 40 engages an adjacent face 42 of the motion picture mechanism frame, see Figs. 3 and 12. A slot 43, extending longitudinally of the end 20, is formed in the lower projection 40, and a lever 44 is fulcrumed at a point midway between its ends in said slot upon a pin 45. See Figs. 9 and 11. A compression spring 46 is inset in a depression at the bottom of the slot adjacent the forward end of the lever and a depression in the forward end of the lever, and normally tends to position the forward end of the lever beyond the face of the extension. The slot 43 is disposed to face the said adjacent face 42 of the motion picture mechanism and the forward end of the lever is disposed to engage said face when the device is in attached position thereon as shown in Figs. 3 and 12. Thus the spring 46 presses the forward end of the lever against the face 42 and turning movement of the device upon the end 20 under the impulse of the spring is opposed by the engagement of the upper extension engaged with the face 42. Consequently the end 20 is cramped in the formation 41 of the motion picture mechanism, and the device is securely attached thereto though it may be removed and attached quickly and easily. To further facilitate the removal and attachment of the device on the camera the rearward end of the lever 44 is engaged in the groove of a push pin 47 mounted for sliding movement in a hole of the lower projection 40, so that by pushing upon the push pin the forward end of the lever 44 is moved into the slot out of effective cramping position, see Fig. 11. Thus it will be noted that a simple yet effective means for attaching the device to the motion picture mechanism is provided which may be removed and attached quickly and easily.

The motion picture mechanism is provided with a usual drive shaft 48 which is mounted for rotation in the bore of the formation 41. The rear end of the shaft 48, is provided with a clutch formation 49 which is adapted to engage a corresponding clutch formation 50, formed in the forward end of shaft 33, when the shaft 33 is in its forward position to form a driving connection therebetween. When the shaft 33 is moved to its rearward position, as hereinbefore described, the clutch formations 49 and 50 are out of engagement and the driving engagement thereof is broken. This arrangement affords convenience in the operation of a motion picture camera under various conditions. As hereinbefore described the shaft 33 is held in its forward driving position by the spring 27. This permits the device being attached to the camera without interference from the clutch formations when the interengaging formations thereof are not in registry, because when they are so positioned the movement of the device into attached position engages the ends of the shafts 33 and 48 and pushes shaft 33 rearwardly until relative motion of the two shafts registers the clutch formations thereof, at which time the shaft 33 is moved forward by spring 27 to engage clutch formations 49 and 50 and establish the driving connection.

The speed governor of the device is disposed in the casing 1 between the support 10 and the cap 3 and functions in the preferred form of the invention, to absorb the surplus power of the motor which is not used to drive the motion picture mechanism at the desired speed. The governor will now be described.

The shaft 5 of the motor extends rearwardly of the bearing 9 and the support 10. Mounted on this rearward end of the shaft 5 is a bored governor arbor comprising a shank 51 and a head 52 at the rear end thereof. See Figs. 3 and 6. The arbor is secured against rotation on shaft 5 by a key 53, and a headed screw 54 is screw threaded into the rear end of shaft 5 and clamps the arbor and inner race of the bearing 9 between its head and a rearwardly facing shoulder formed on shaft 5 just forward of the bearing 9. The flange of the bore of the support 10 in which the bearing 9 is mounted is disposed rearwardly of this bearing, thus preventing rearward thrust of shaft 5. The pinion gear 39 abuts the commutator, attached to the armature 4 which is secured to shaft 5 in the usual manner, with its one end and the inner race of the bearing 8 with its other end, while the outer race of bearing 8 abuts the closed end of the bore in which the bearing is supported, thus preventing forward thrust of shaft 5. Mounted on the arbor for longitudinal movement thereon is a bored rotating friction element consisting of a friction disk 55 having the bore thereof slidably mounted on the head 52 of the arbor, a cylindrical extension 56 extending forwardly from the disk, and an internal circumferential flange 57 formed at the forward end of the cylindrical extension and slidably engaging the forward end of the shank 51 of the arbor, this arrangement affording two bearings for the friction element disposed some distance apart, thus reducing the possibility of the friction element cramping on the arbor and causing undue friction between it and the arbor with the consequent irregular action of the governor. This friction element is positively rotated with the arbor by a roller 58 mounted for rotation on the internally projecting end of a pin 59, secured in the flange 57, and engaging a longitudinal keyway 60 formed on the shank 51 of the arbor, see Figs. 3, 5, and 6, this construction reducing to a minimum friction arising from this source resisting longitudinal movement of the friction element upon the arbor to further prevent irregular action of the governor. A coiled compression spring 61 encircles the shank 51 and abuts the head 52 of the arbor and the flange 57 with its opposite ends to normally maintain the friction element in its forward position. The cylindrical extension 56 is enlarged immediately in front of the disk 55 and has four slots 62 formed therein, and regularly spaced from each other, these slots being disposed tangentially with respect to the axis of the friction element and facing forwardly. See Figs. 3, 5, and 7. The cylindrical extension 56 is slotted radially, as designated at 63 at four equidistant points, each of these slots 56 being disposed at right angles to a respective tangential slot 62. The slots 63 extend forwardly to a step 64 formed in the extension 56 at about its center to allow the governor weights, hereinafter described, to move closer toward the axis of rotation than would otherwise be the case. Secured in respective slots 62 and extending across respective slots 63 are studs 65, they being secured in their respective grooves by headed screws 66 screw threaded into the friction element with the shanks thereof extending across the slots at the ends of the studs and with the heads thereof overlying the ends of the studs at the open sides of the slots. Governor weights 67, which are in the form of levers, extend into slots 63 and have their one ends pivoted on respective studs 65. Gear teeth 68 are formed on the pivoted ends of these weights around the pivotal axis thereof which engage circumferential gear teeth 69, see Fig. 6, formed on the outer surface of the head 52 of the arbor. The free ends of the governor weights are weighted by lateral extensions 70, these lateral extensions being disposed to lie forward of the step 64 aforementioned to allow the weights to move closer toward the axis of rotation than would otherwise be the case.

In the rotation of the shaft 5 the centrifugal force exerted upon the governor weights tends to pivot them outwardly from the axis of rotation, and this movement through the intermeshing teeth 68 and 69 moves the friction element rearwardly upon the arbor against the influence of the spring 61.

A stationary friction element 71 is disposed rearwardly of the rotating friction element and in front of the cap 3. The forward face of the stationary friction element has a friction facing 72 of leather or other appropriate friction material which is engaged and clutched by the rear face of the rotating friction element when it is moved rearwardly due to the governor weights overcoming the influence of the spring 61. The friction element 71 is supported from the cap 3 rearward of the same. The support of this friction element provides for adjustment of the same to and away from the rotating friction element to vary the controlled speed of the motion picture mechanism, this being accomplished by the structure now to be described. The cap 3 is bored in alinement with the shaft 5, the bore being continued forwardly by a boss 73 and rearwardly by a boss 74 formed on the cap to provide a bore of sufficient length. A rearwardly projecting stem 75 is formed on the friction element 71, and is mounted for sliding movement in the said bore of the cap. A stud 76 is secured in a hole of the cap and extends forwardly through an opening 77 formed in the friction element 71 to prevent rotation of the same. The stem 75 is bored concentrically and internal screw threads 78 are formed at the rear end of this bore. Screw threaded into these threads is a screw 79, and mounted for rotation on the boss 74 on the outside of the cap is a manipulating knob 80, which is closed at its rear end. The rear end of this knob is secured against a rearwardly facing shoulder formed on the rear end of the screw 79 by a headed screw 81 passing through a hole in the end of the knob and screw threaded into the screw 79. A coiled compression spring 82 encircles the boss 73 of the cap and abuts the wall of the cap and the friction element 71 with its opposite ends to maintain the end of the manipulating knob against the end of boss 74 and to maintain pressure on the remainder of the adjusting mechanism to prevent lost motion therein interfering with the actuation of the governor.

A pointer 83 extends radially from the knob 80 and moves over the outer face of the cap when the knob is rotated. Indicia 84 inscribed on the outer face of the cap to cooperate with the pointer indicate the speed of the motion picture mechanism when the knob 80 is in various positions. An undercut groove 85 is formed on the outer face of the cap 3 within the radius of the pointer 83. Mounted in this groove are two stop lugs which may be adjusted in various positions in said groove to be engaged by the pointer 83 to limit the rotation of the knob 80, thereby providing means whereby the movement of the knob may be predetermined prior to such movement so that the change from one speed may be made quickly and precisely, which is essential in the operation of a motion picture camera. Each stop lug includes a segmental piece 86, adapted to fit in groove 85, having the mid portion of the bottom surface stepped upwardly, as designated at 87, see Fig. 4, and having a hole therein extending upwardly at such mid portion; a T-headed screw 88, the shank of which is passed through said hole from the bottom of the segmental piece, and the head of which is narrow enough to pass into the undercut portion of the groove, which head is long enough to bridge the narrow portion of the groove and underlie the undercut portion of the groove, when turned after insertion in the groove, and which head, when turned, will lie in the slot, formed in the bottom of the segmental piece by the upwardly stepped portion thereof, to allow the end portions of the bottom to engage the bottom of the groove when the head of the screw is engaged with the under cut portions of the groove; and a nut 89 screw threaded on the shank of the screw and operating, when the lug is inserted in the groove, to press the end portions of the segmental piece against the bottom of the groove and to pull the head of the screw against the undercut portions of the groove, thereby clamping the lug in the groove in any adjusted position. The segmental pieces 86 when clamped in the groove extend above the surface of the cap and lie in the path of the pointer 83 to engage the same and limit the movement thereof, and consequently rotation of the knob 80. In the operation of the device when it is desired to change the speed of the mechanism the stop lug lying on the side of the pointer in the direction in which it is to be moved is adjusted to the proper position at any time prior to such movement. At the time of change the knob is simply rotated in the proper direction until rotation thereof is stopped by engagement of the pointer with this stop lug.

By reason of the fact that the shaft is offset from the motor shaft 5, the device may be positioned on the camera in back of the body thereof where it does not interfere with the manipulation of a camera to which it is attached. The gear 36 and pinion 39 constitute reduction gearing between the motor shaft and shaft 33 thus providing a convenient drive between shaft 5 and 33 and permitting the motor to run at a relatively high speed which is beneficial thereto. Where the governor is directly connected to the motor as shown this arrangement also permits the governor to run at a relatively high speed which effects a more uniform control of the speed of the motion picture mechanism. The disposition of the governor at one end of the motor and the driving connection at the other disposes the governor in a very convenient position both with a view toward manipulation and accessibility.

It will be noted further that the arrangement of the motor and governor within the casing effects a very simple and accessible assembly and that the alinement of the various elements thereof is insured due to the fact that all the finished surfaces of the casing and the cap may be machined in one setting.

Figure 1:
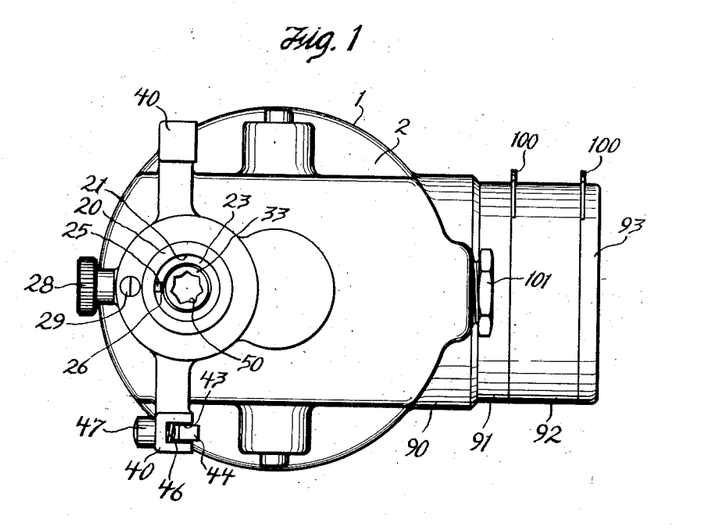
Figure 1 is a view in front elevation of the preferred form of my present invention.
Figure 2:
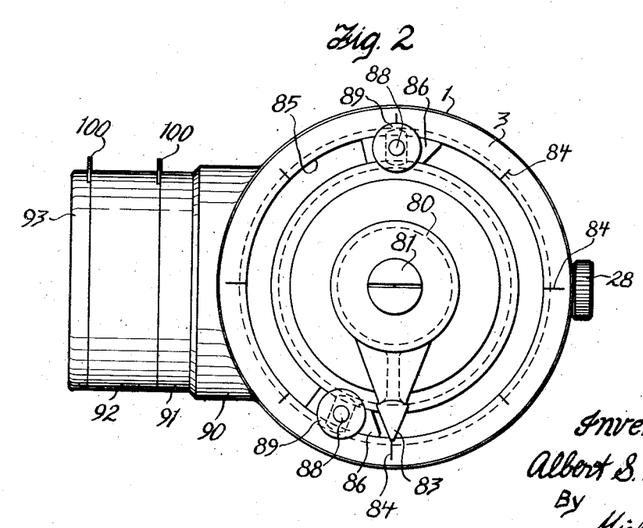
Figure 2 is a view in rear elevation of the same.

The electric motor is a series wound motor adapted to be operated by either a direct current or an alternating current, the change from one current to the other being effected by an appropriate switch in circuit. Provision is also made for reversing the motor as very often it is necessary to reverse the movement of a motion picture mechanism. This is also accomplished by an appropriate switch in circuit. These switches are mounted in superposed relation upon a boss 90 formed on one side of the casing 1 through which an aperture communicates with the enclosure of the casing. The switches are secured within a casing formed of a lower piece 91, a center piece 92, and a top or cover 93, all of which are secured together on said boss 90 by headed screws 94 passing through respective holes in each and screw threaded into the boss 90. See Fig. 3. The lower piece 91 and the center piece 92 each have a centrally apertured web 95 formed therewith in which is mounted for rotation an arbor 96 of insulating material, and secured upon these arbors are contact arms 97 which are adapted to contact various contact pieces 98 secured in insulated disks 99 secured respectively to the lower piece 91 and center piece 92. Operating levers 100 are secured to respective of the arbors 96 and extend through slits formed in the side of the switch casing to permit manipulation of the arbors from the exterior of the switch casing, see Figs. 1, 2 and 9.

The wires of the circuits are secured to the brushes 18 and the contact pieces 98 in the usual manner, the web 95 and disk 99 of the lower piece 91 being apertured for such wires. The casing 1 is apertured adjacent the switch casing, see Fig. 3, to provide for the extension line wires, and an end bushing 101 of the usual protective casing of such extension line wires is screw threaded into this aperture in the usual manner. The wiring is not shown in the structural views to avoid confusion, but is shown in diagram in Fig. 10 in which 102 designates one line wire, 103 the other, these leading to separate contacts 98 of the alternating current switch, which is the outer one of the two within the switch casing of the device and designated at 104 in Fig. 10. Wires 105 run from a pair of separate contact pieces 98 of the switch to one end of the field coils 6 of the motor. From the other end of these field coils wires 106 lead to separate contact pieces 98 of the reversing switch, which is the inner one of the two within the switch casing of the device and designated at 107 in Fig. 10. From separate contacts 98 of the switch 107 wires 108 lead to respective brushes contacting the commutator 17 of the armature 4. Wires 109 lead from separate contact pieces 98 of the switch 104 to mid points of the field coils 6. When the contact arms 97 of the switch 104 are positioned to connect wire 102 with one wire 105 and wire 103 with the other wire 105, as designated at 110, the circuit through the motor is set for use with direct current, and when these contact arms 97 of switch 104 are positioned to connect wire 102 with one wire 109 and wire 103 with the other wire 109, as designated at 111, the circuit through the motor is set for use with alternating current. When the contact arms 97 of the switch 107 are positioned to connect wires 106 and 108, as designated at 112, the circuit through the motor is set to rotate the armature 4 in one direction, and when the contact arms 97 of the switch 107 are positioned to connect wires 106 with the opposite wires 108, as designated at 113 the circuit through the motor is set to rotate the armature 4 in the opposite direction. The switch 107 may be used as a starting and stopping switch by manipulating it with respect to a mid point of the path of the operating lever 100 thereof.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

Claims.

1. A motor drive for motion picture machines including an electric motor, a driving connection therefrom adapted to drive a motion picture mechanism disposed at one end of the motor and including a shaft offset from the motor axis, and a speed governor adapted to control the speed of the motor disposed at the other end of the motor in alinement therewith.

2. A motor drive for motion picture machines including an electric motor, a shaft, a driving connection between the motor and the shaft and disposed at one end of the motor and including a friction slip clutch device, and a manually adjustable centrifugal speed governor driven by and adapted to control the speed of the motor and disposed at the other end of the motor.

3. A motor drive for motion picture machines including an electric motor, a shaft, a driving connection between the motor and shaft and disposed at one end of the motor including reduction gearing, and a manually adjustable centrifugal speed governor for controlling the speed of the motor and disposed at the other end of the motor and including a centrifugal device carried and driven by the motor shaft.

4. A motor drive for motion picture machines including an electric motor, reduction gearing disposed at one end of the motor for driving a motion picture mechanism therefrom, and a manually adjustable centrifugal speed governor disposed at the other end of the motor and adapted to control the speed of the same.

5. A motor drive for motion picture machines including an electric motor, a shaft offset from the motor axis, reduction gearing disposed at one end of the motor for driving the shaft therefrom, and a manually adjustable centrifugal speed governor driven by and adapted to control the speed of the motor and disposed at the other end of the motor.

6. A motor drive for motion picture machines including an electric motor, a shaft disposed in axial parallelism with the motor axis, a large spur gear carried by the shaft for driving the same, a small spur gear secured to one end of the motor shaft and meshing with the large gear for driving the same, and a manually adjustable centrifugal speed governor for controlling the speed of the motor and disposed at the other end of the motor and including a centrifugal device carried and driven by the motor shaft.

7. A motor drive for motion picture machines including an enclosing casing open at one end, a cap removably secured to the casing and closing said end, an electric motor mounted within the casing, and a centrifugal speed governor operated by the motor for controlling the speed thereof and including a centrifugal device and a coöperating stationary friction element both of which are disposed within the enclosure of the casing and cap between the motor and cap.

8. A motor drive for motion picture machines including an enclosing casing open at one end, a cap removably secured to the casing and closing that end, an electric motor mounted within the casing with its axis disposed endwise of the casing, and a centrifugal speed governor for controlling the speed of the motor and including a centrifugal device disposed within the enclosure of the casing and cap between the motor and cap and in axial alinement with and driven from the motor shaft and a cooperating stationary friction element disposed within said enclosure between the centrifugal device and cap.

9. A motor drive for motion picture machines including an enclosing casing open at one end, a cap removably secured to the casing and closing said end, an electric motor mounted within the casing with its axis disposed endwise of the casing, and a centrifugal speed governor for controlling the speed of the governor and including a centrifugal device disposed within the enclosure of the casing and cap between the motor and cap and carried and driven by the motor shaft, a cooperating friction element disposed within said enclosure between the centrifugal device and the cap, and means carried by the cap for supporting and adjusting the stationary friction element to vary the controlled speed of the motor including a manipulating member operable from the exterior of the cap.

10. A motor drive for motion picture machines including an enclosing casing open at one end, a cap removably secured to the casing and closing said end, a central support carried by the casing within the enclosure of the cap and casing and disposed intermediate the cap end of the enclosure and the opposite end thereof, an electric motor disposed within the casing on the side of said support opposite the cap and having its axis disposed endwise of the casing and including a motor shaft bearing on said support, and a centrifugal speed governor for controlling the speed of the motor including a centrifugal device disposed within the enclosure of the casing and cap between the support and cap and carried and driven by the motor shaft and a cooperating stationary friction element carried by the cap and disposed within said enclosure between the centrifugal device and the cap.

11. A motor drive for motion picture machines including an enclosing casing open at one end and having an integral end wall closing the opposite end thereof, a cap removably secured to the casing and closing the open end thereof, a central support detachably secured within the casing intermediate the ends of the enclosure of the cap and casing, an electric motor disposed within the casing between said end wall and the support and having its axis extending endwise of the casing and including motor shaft bearing on said end wall and support, and a centrifugal speed governor for controlling the speed of the motor including a centrifugal device disposed within the enclosure of the casing and cap between the support and cap and carried and driven by the motor shaft and a cooperating stationary friction element disposed within said enclosure between said support and cap.

12. A motor drive for motion picture machines including an enclosing casing open at one end and having an integral end wall closing the opposite end thereof, a cap removably secured to the casing and closing the open end thereof, a central support detachably secured within the casing intermediate the ends of the enclosure of the cap and casing, an electric motor disposed within the casing between said end wall and the support and having its axis extending perpendicularly to the plane of the open end of the casing and including motor shaft bearings on said end wall and support, and a centrifugal speed governor for controlling the speed of the motor including a centrifugal device disposed within the enclosure of the casing and cap between the support and cap and carried and driven by the motor shaft, a cooperating stationary friction element disposed within said enclosure between the centrifugal device and cap, and means carried by the cap for supporting and adjusting the stationary friction element to vary the controlled speed of the motor including a manipulating member operable from the exterior of the cap.

13. A motor drive for motion picture machines including an enclosing casing open at one end and having an integral end wall closing the opposite end wall thereof, a cap removably secured to the casing and closing the open end thereof, a shoulder formed on the inside of the casing and facing the open end thereof, a central support adapted to bear against said shoulder, an electric motor disposed within said casing between the end wall and the support and having its axis extending perpendicularly to the plane of the ends of the casing and including motor shaft bearings on said end wall and the support, studs spaced around the axis of the motor in parallelism therewith and supporting the fields of the motor and having the ends thereof adjacent said end wall secured in the casing, means cooperating with said studs to secure said support against said shoulder, said means being accessible from the open end of the casing for removal of the support, and a centrifugal speed governor for controlling the speed of the motor including a centrifugal device disposed within the enclosure of the casing and cap between the support and cap and carried and driven by the motor shaft, and a cooperating stationary friction element disposed within said enclosure between said centrifugal device and cap and supported from the cap.

14. A motor drive for motion picture machines including an electric motor, a shaft, a gear, a pair of friction members mounted on the shaft for frictionally engaging opposite sides of the gear, spring means carried by the shaft for pressing the gear between said friction members, and a driving connection between the motor and gear.

15. A motor drive for motion picture machines including an electric motor, a shaft having one end reduced and forming a shoulder, a bored friction member keyed to the shaft and bearing against said shoulder, a second bored friction member keyed on the reduced end of said shaft outwardly of the other friction member and movable longitudinally of the shaft, a large bored gear between said friction members against opposite sides of which the friction members are adapted to bear, a headed screw screwthreaded into the reduced end of the shaft, a coiled compression spring encircling the reduced end of the shaft and abutting the head of the screw and said second friction member for pressing the gear between said friction members, and a small gear secured to the motor shaft and meshing with said large gear.

16. A motor drive for motion picture machines including an electric motor, a longitudinally movable shaft, a gear, a friction slip clutch device for driving the shaft from the gear, a driving clutch formation on said shaft adapted to engage a corresponding clutch formation of a motion picture mechanism, means for controlling the longitudinal movement of said shaft to engage and disengage said clutch formations, and a driving connection between the motor and said gear.

17. A motor drive for motion picture machines including an electric motor, a longitudinally movable shaft, a gear, a pair of friction members mounted on the shaft for frictionally engaging opposite sides of the gear for frictionally driving the shaft from the gear, spring means carried by the shaft for pressing the gear between said friction members, a driving clutch formation on said shaft adapted to engage a corresponding clutch formation of a motion picture mechanism, means for controlling the longitudinal movement of said shaft to engage and disengage said clutch formations, and a driving connection between the motor and said gear including a second gear secured to the motor shaft.

18. A motor drive for motion picture machines including an electric motor, a longitudinally movable shaft disposed in parallelism with the motor axis having one end reduced and forming a shoulder, a bored friction member keyed on the shaft and bearing against said shoulder, a second bored friction member keyed on the reduced end of the shaft outwardly of the other friction and movable longitudinally on the shaft, a large bored spur gear between said friction members against opposite sides of which the friction members are adapted to bear, a headed screw screwthreaded into the reduced end of the shaft, a coiled compression spring encircling the reduced end of the shaft and disposed between the head of the screw and said second friction member for pressing said friction members against opposite sides of the gear to frictionally drive the shaft from the gear, a driving clutch formation on said shaft adapted to engage a corresponding clutch formation of a motion picture mechanism, means for controlling the longitudinal movement of the shaft to engage and disengage said clutch formations, and a small spur gear secured to the motor shaft and meshing with said large spur gear.

19. A motor drive for motion picture machines including an electric motor, a longitudinally movable shaft, a gear carried by said shaft to drive the same, a driving clutch formation on said shaft adapted to engage a corresponding clutch formation of a motion picture mechanism, means for controlling the longitudinal movement of said shaft to engage and disengage said clutch formations, and a second gear secured to the motor shaft and meshing with said first mentioned gear.

20. A motor drive for motion picture machines including a frame, means on the frame for detachably securing the frame to a motion picture machine, an electric motor mounted on the frame, a longitudinally movable shaft carried by the frame in alinement with the attaching movement of the frame, means carried by the frame for driving said shaft from the motor, a driving clutch formation on the shaft adapted for engagement and disengagement with a corresponding clutch formation of the motion picture machine in the longitudinal movement of the shaft, spring means on the frame for longitudinally moving the shaft into engaging position, and manually operated means on the frame for longitudinally moving the shaft into disengaging position against the influence of said spring means.

21. A motor drive for motion picture machines including a frame provided with a longitudinally bored part adapted to telescope with a corresponding formation of a motion picture machine when the frame is attached thereto, an electric motor mounted on the frame, a longitudinally movable shaft carried by the frame in alinement with and extending in said bored part, means carried by the frame for driving said shaft from the motor, a positive driving clutch formation on the shaft adapted for engagement and disengagement with a corresponding clutch formation of the motion picture machine in the longitudinal movement of the shaft, and means on the frame for controlling the longitudinal movement of the shaft and adapted to permit disengaging movement of the shaft caused by the abutment of said clutch formations when in non-engaging relation during attachment of the frame to the motion picture mechanism.

22. A motor drive for motion picture machines including a frame provided with a longitudinally bored part adapted to telescope with a corresponding formation of a motion picture machine when the frame is attached thereto, an electric motor mounted on the frame, a longitudinally movable shaft carried by the frame in alinement with and extending in said bored part, means carried by the frame for driving said shaft from the motor, a positive driving clutch formation on the shaft adapted for engagement and disengagement with a corresponding clutch formation of the motion picture machine in the longitudinal movement of the shaft, a spring for moving the shaft into clutch engaging position, and manually operated means on the frame for longitudinally moving the shaft into disengaging position against the influence of said spring.

23. A motor drive for motion picture machines including a frame provided with a longitudinally bored part having the inner end of the bore thereof reduced and forming an outwardly facing shoulder, said bored part being adapted to telescope with a corresponding formation of a motion picture machine when the frame is attached thereto, an electric motor mounted on the frame in axial parallelism with said bore, a longitudinally bored member mounted in said bore and provided with an external shoulder facing the shoulder of said bore, a spring encircling said bored member and engaging said shoulders to move said bored member outwardly, manually operable means on said frame for moving said bored member inwardly against the influence of said spring, a shaft journaled in the bore of said bored member for longitudinal movement therewith, a positive clutch formation on the outer end of said shaft adapted for engagement and disengagement with a corresponding clutch formation of the motion picture machine in the longitudinal movement of the shaft with said bored member, a large spur gear carried on the inner end of said shaft for driving the same, and a small spur gear secured on the motor shaft and meshing with said large gear.

24. A motor drive for motion picture machines including a casing, an electric motor mounted in said casing, a hollow extension formed on said casing adapted to telescope with a corresponding formation of the frame of a motion picture mechanism, a driving element disposed within said extension and including a clutch formation adapted to engage a corresponding clutch formation of the motion picture mechanism when said extension is telescoped with the corresponding formation of the frame of the motion picture mechanism, a driving connection in the casing between said motor and said driving element, and means on said casing adapted to engage the frame of the motion picture mechanism to secure said extension in telescoped relation with the corresponding formation of the frame of the motion picture mechanism.

25. A motor drive for motion picture machines including a casing, an electric motor mounted in said casing, a hollow extension formed on said casing adapted to telescope with a corresponding formation of the frame of a motion picture mechanism, a driving element disposed within said extension and including a clutch formation adapted to engage a corresponding clutch formation of the motion picture mechanism when said extension is telescoped with the corresponding formation of the frame of the motion picture mechanism, a driving connection in the casing between said motor and said driving element, and means on said casing adapted to engage the frame of the motion picture mechanism to secure said extension in telescoped relation with the corresponding formation of the frame of the motion picture mechanism including a face element adapted to engage an opposing face of the frame of the motion picture mechanism and cramp said hollow extension telescoped with the corresponding formation of the frame of the motion picture mechanism.

26. A motor drive for motion picture machines including a motor, an adjustable centrifugal speed governor for controlling the speed at which a motion picture machine is driven by the motor including a manually operated movable member for adjusting the same, and a pair of independently adjustable stop devices for adjustably limiting movement of said member in respective opposite directions.

27. A motor drive for motion picture machines including an electric motor, an adjustable centrifugal speed governor for controlling the speed of the motor and including a pivoted manually operated movable member provided with an adjustment indicating arm, and a pair of stop devices independently adjustable in the path of said arm for adjustably limiting movement of said member in respective opposite directions.

In witness whereof I hereunto affix my signature this 29th day of May, 1920, A. D.

ALBERT S. HOWELL.